United States Patent
Takahashi

[11] 3,856,385
[45] Dec. 24, 1974

[54] WIDE-ANGLE LENS ASSEMBLY OF RETROFOCUS TYPE

[75] Inventor: Yasuo Takahashi, Tokyo, Japan

[73] Assignee: Asahi Kogaku Kogyo Kabushiki Kaisha, Tokyo-to, Japan

[22] Filed: Apr. 25, 1973

[21] Appl. No.: 354,198

[30] Foreign Application Priority Data
May 1, 1972   Japan................................. 47-43506

[52] U.S. Cl.................................. 350/214, 350/176
[51] Int. Cl..................... G02b 9/00, G02b 1/00
[58] Field of Search............................ 350/214, 176

[56] References Cited
UNITED STATES PATENTS

| | | | |
|---|---|---|---|
| 3,512,874 | 5/1970 | Wöltche | 350/214 |
| 3,576,360 | 4/1971 | Shimizu | 350/176 |
| 3,736,049 | 5/1973 | Shimizu | 350/214 |

*Primary Examiner*—Paul A. Sacher
*Attorney, Agent, or Firm*—Steinberg & Blake

[57] ABSTRACT

A wide-angle retrofocus type of objective composed of eight lenses, wherein the third and fourth lenses are cemented together, the objective having a back focus which is at least 1.25 times the focal distance of the entire objective. The front lens is of a relatively small diameter while the parameters of the various lenses are chosen in such a way that an exceedingly effective performance is achieved with aberrations being reduced to a minimum with the group of lenses situated in front of the diaphragm prolonging the back focus while reducing the incident angle on the following group, without undesirably increasing the Petzval sum.

1 Claim, 5 Drawing Figures

WIDE-ANGLE LENS ASSEMBLY OF RETROFOCUS TYPE

BACKGROUND OF THE INVENTION

The present invention relates to objectives for photographic cameras.

In particular, the present invention relates to wide-angle objectives of the retrofocus type.

Although objectives of this general class are known, various difficulties are encountered with such objectives. Thus it is difficult to maintain the front lens of such an objective at a relatively small diameter, and it is difficult to provide a lens performance which reduces aberrations to the desired extent. Moreover, it is difficult to achieve with such a lens a back focus which is prolonged to the desired extent. Thus, with conventional objectives of this type the Petzval sum is undesirably reduced and the incident angle provided by a front group of lenses on a rear group cannot be reduced sufficiently to achieve the desired prolongation of the back focus.

SUMMARY OF THE INVENTION

It is accordingly a primary object of the present invention to provide a wide-angle retrofocus type of objective which will avoid the above drawbacks.

Thus, it is an object of the present invention to provide a wide-angle retrofocus type of objective which has a front lens of relatively small diameter while at the same time having an excellent performance with a back focus prolonged to such an extent that it is at least 1.25 times the focal length of the entire objective.

In addition, it is an object of the invention to provide an objective of the above type which will not undesirably reduce the Petzval sum while at the same time maintaining the relationship between the lenses of the objective at parameters which will reduce aberrations to a minimum while at the same time achieving the desired effect.

According to the invention the wide-angle retrofocus type of objective has a front lens of a relatively small diameter and an excellent lens performance, providing a back focus which is at least 1.25 times the focal length of the entire objective.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
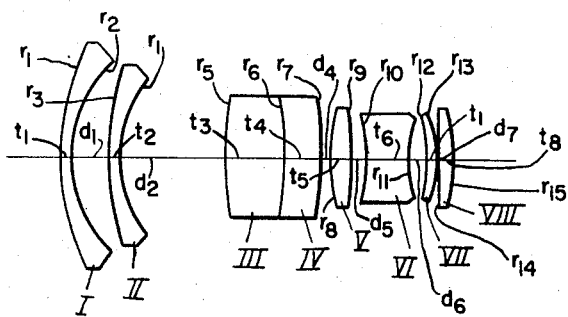
FIG. 1 is a schematic illustration of an objective according to the invention.

An objective according to the present invention is schematically illustrated in FIG. 1. Thus it will be seen from FIG. 1 that the objective includes eight lenses I–VIII. Lens I is the front lens of the objective while lens VIII is the rear lens of the objective. In other words, the object to be photographed will be situated to the left of the objective of FIG. 1 and the image side is located to the right of the objective of FIG. 1.

As may be seen from FIG. 1, the first two lenses I and II are negative maniscus lenses both of which have front surfaces (at the left in FIG. 1) which are of a larger radius of curvature than their rear surfaces. Lens III is a convexo-convex lens of relatively large thickness having its rear surface cemented to the front surface of lens IV which is a negative lens of relatively low degree. Lens V is also a convexo-convex lens, having a rear surface which is of a larger radius of curvature than its front surface. Lens VI is a negative lens of relatively large thickness. Lenses VII and VIII are both positive maniscus lenses having their convex surfaces at the rear, directed toward the image side of the objective.

The objective of the invention conforms to the following characteristics:

(1) $F/0.95 < |F_{1 \cdot 2}| < F/0.5$, $F_{1 \cdot 2} < 0$
(2) $F/0.12 < |F_{1 \cdot 2 \cdot 3 \cdot 4}| < \infty$
(3) $0.23F < t_6 < 0.32F$
(4) $2 < r_9/r_{10} < 3$
(5) $0.8F < r_{11} < F$ where $F$ is the focal length of the entire objective, $F_{1 \cdot 2}$ is the composite focal length of lenses I and II, $F_{1 \cdot 2 \cdot 3 \cdot 4}$ is the composite focal length of lenses I–IV, $t_6$ is the thickness of lens VI, $r_9$ is the radius of curvature of the rear surface of lens V, while $r_{10}$ and $r_{11}$ are respectively the radii of curvature of the front and rear surfaces of lens VI.

Requirement 1 above determines the degree of the negative lenses included the front group, or more specifically of lenses I and II. If $|F_{1 \cdot 2}|$ is shorter than $F/0.95$, there would be certain advantages such as establishing an advantageous angle relative to the subsequent groups, prolonging the back focus, and reducing the diameter of the front lens, but at the same time there would be various disadvantages such as a tendency for various aberrations such as, for example, coma aberration to increase beyond the possibility of being effectively corrected in the following groups since the Petzval sum would be reduced undesirably and the radius of curvature would increase. If $|F_{1 \cdot 2}|$ is longer than $F/0.5$ on the other hand, the above advantages would instead be converted into problems.

Requirement 2 indicates that the front group of lenses I–IV, which are situated in front of the diaphragm, should be of no degree and are considered simply as an attachment to the following lens groups. In the front part of the objective which is situated before the diaphragm, it is important above all to prolong the back focus and to reduce the incident angle on the following group. Such an arrangement, however, when excessive, would easily lead to an undesirable reduction of the Petzval sum. In the specific embodiment of the invention which is described below, there is provided a negative value of about 0.15. When $|F_{1 \cdot 2 \cdot 3 \cdot 4}|$ is negative and shorter than $F/0.12$, the Petzval sum is decreased to such an extent that it would become extremely difficult for the aberration balance to be corrected effectively. When $|F_{1 \cdot 2 \cdot 3 \cdot 4}|$ is positive and shorter than $F/0.12$, the arrangement according to which two negative lenses are used in the front group would lose the intended effects since the incident angle upon the following groups would not be sufficiently reduced, and such a selection of composite focal length would be ineffective for prolongation of the back focus.

Requirement 3 is to provide proper correction of coma aberration caused by light rays of relatively low incident height, without disturbing the desired function of the tenth surface. Although the tenth surface (the front surface of lens VI) should preferably be situated as close as possible to the ninth surface (rear surface of lens V), in order to provide a desired correction of spheric aberration, the spheric aberration occurring at the tenth surface can be corrected in such a way as to provide a rather excessive correction, while the distance between the tenth surface and the ninth surface is preferably selected to achieve a well balanced correction of aberrations such as color aberration. It is preferred to correct coma aberration with an eleventh surface (rear surface of lens VI) which is spaced substantially beyond the tenth surface. One of the effects achieved with lens VI, which is a negative lens, obviously is to convert from an undesirably small extent of correction of color aberration into an excessive extent of correction of color aberration. This result is achieved by utilizing for lens VI a glass which has a small $v$ value (Abbe number). Thus it will be noted from Table 1 below than lens VI has an Abbe number of only 25.4. Although it is generally preferable to have a refractive index which is as low as possible, the refractive index which can be practically selected is only in a higher range, but this feature is advantageous in preventing the Petzval sum from being undesirably reduced while readily enlarging the radius of curvature $r_{11}$ of the rear surface of lens VI. As a result, elimation of coma aberration largely depends upon the radius of curvature and the thickness of the lens. Thus, when the lens thickness $t_6$ is less than 0.23F, the rear surface of lens VI would be undesirably close to the preceding group of lenses and undesirable aberration would easily be produced by light rays of relatively low incident height in the direction in which the height of the image is reduced. In contrast, aberration would easily occur in the opposite direction if $t_6$ is greater than 0.32F.

The above requirements 1 to 3 may vary in association with requirement 5 and if $r_{11}$ in requirement 5 is shorter than 0.8F, aberration would occur in the same direction as the case where $t_6$ is longer than 0.32F. Assuming that $r_{11}$ is longer than F when $t_6$ is longer than 0.32F, it is obvious that the overall balance of aberrations such as color aberration would be seriously affected.

Requirement 4 determines the aberration balance at the ninth and tenth surfaces (rear surface of lens V and front surface of lens VI) wherein, if $r_9/r_{10}$ is less than 2, the aberration which occurs at the ninth surface would be too great to be effectively corrected by other surfaces and when $r_9/r_{10}$ is greater than 3, the aberration at the tenth surface would, in contrast, be too great. Balance at the ninth and tenth surfaces emphasizes rather correction of spheric aberration and sine condition.

A specific embodiment of the invention as illustrated in FIG. 1 has the data set forth in the following Table 1:

TABLE 1

| Lens | | | F = 100 mm | | Glass $n$ | Constants $v$ |
|---|---|---|---|---|---|---|
| I | $r_1$ | = + | 160.34 | | | |
| | | | | $t_1$ = 6.94 | 1.51633 | 64.1 |
| | $r_2$ | = + | 78.42 | | | |
| | | | | $d_1$ = 22.55 | | |
| II | $r_3$ | = + | 187.33 | | | |
| | | | | $t_2$ = 6.94 | 1.58913 | 61.1 |
| | $r_4$ | = + | 81.33 | | | |
| | | | | $d_2$ = 62.44 | | |
| III | $r_5$ | = + | 242.83 | | | |
| | | | | $t_3$ = 34.69 | 1.62004 | 36.3 |
| IV | $r_6$ | = − | 242.83 | | | |
| | | | | $t_4$ = 24.28 | 1.51633 | 64.1 |
| | $r_7$ | = − | 222.49 | | | |
| | | | | $d_4$ = 5.20 | | |
| V | $r_8$ | = + | 103.19 | | | |
| | | | | $t_5$ = 11.45 | 1.81554 | 44.5 |
| | $r_9$ | = − | 261.91 | | | |
| | | | | $d_5$ = 8.67 | | |
| | $r_{10}$ | = − | 122.46 | | | |
| VI | | | | $t_6$ = 27.75 | 1.80518 | 25.4 |
| | $r_{11}$ | = + | 90.19 | | | |
| | | | | $d_6$ = 8.60 | | |
| | $r_{12}$ | = − | 109.64 | | | |
| VII | | | | $t_7$ = 7.28 | 1.69350 | 50.8 |
| | $r_{13}$ | = − | 68.62 | | | |
| | | | | $d_7$ = 0.49 | | |
| | $r_{14}$ | = − | 648.62 | | | |
| VIII | | | | $t_8$ = 8.67 | 1.71300 | 54.0 |
| | $r_{15}$ | = − | 118.08 | | | |
| | | | $F_{1\cdot 2}$ | = −132.3 | ÷ −F/0.756 | |
| | | | $F_{1\cdot 2\cdot 3\cdot 4}$ | = +1135.9 | ÷ F/0.088 | |
| | | | $F_B$ | = 1.295F | | | where the radius of curvature $r_6$ is the radius of curvature of the surface which is common to the cemented lenses III and IV, the several radii $r_1$–$r_{15}$, lens thicknesses $t_1$–$t_8$, and distances between the lenses $d_1$–$d_7$ being given in millimeters, with the focal length F of the entire lens being 100 mm, while the radii are considered positive if the centers of curvature are at the rear of the objective and negative if the centers of curvature are at the front of the objective. The glass constants $n$ are values for the $d$-line refracted index, while $v$ is the Abbe number. $F_{1\ 2}$ and $F_{1\ 2\ 3\ 4}$ are respectively the composite focal lengths for the first two and first four lenses, while $F_B$ is the back focal length.

Because lenses III and IV are cemented together, they have a common surface 6, forming the sixth surface of the objective of FIG. 1 which thus has 15 surfaces progressing from the front toward the rear.

Figures 2, 3, 4, 5:
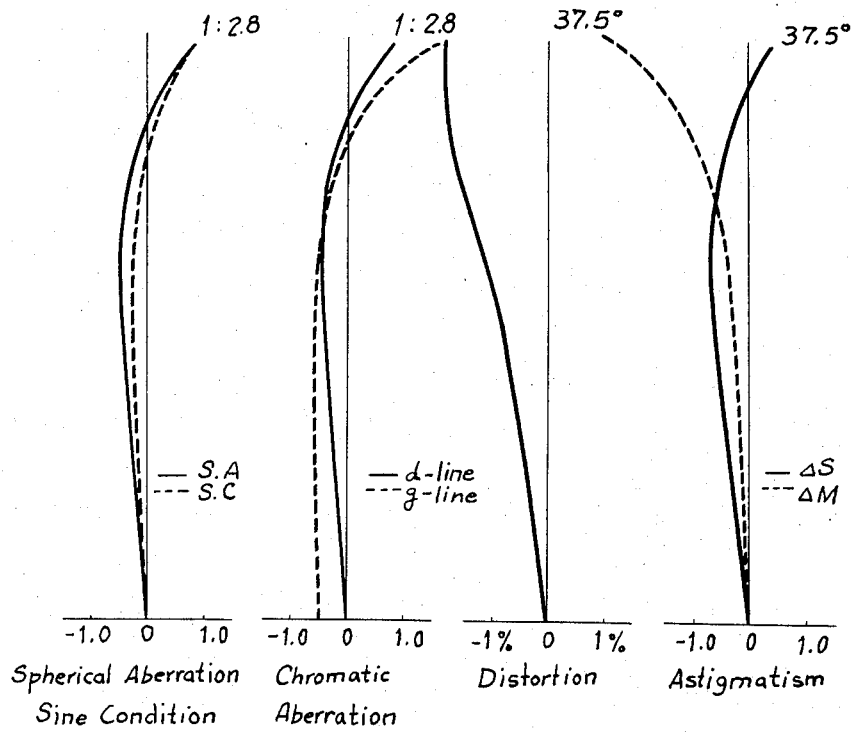
FIGS. 2–5 are respectively graphs illustrating the aberration curves achieved with the objective of the invention.

FIG. 2 is a graph illustrating with the solid curve the spherical aberration and with the dotted curve the sine condition achieved with the objective of the invention where the diaphragm has the maximum aperture shown at the upper part of FIG. 2. FIG. 3 is a graph illustrating chromatic aberration, the solid line curve showing the chromatic aberration for the d-line while the dotted curve shows the chromatic aberration for the g-line.

The distortion curve for the objective of the invention is illustrated in the graph of FIG. 4, while astigmatism is indicated in FIG. 5 where the solid and dotted line curves are respectively for $\Delta S$ and $\Delta M$.

It is thus apparent that an exceedingly effective lens performance with well balanced and minimum aberrations are achieved with the objective of the invention while at the same time providing the desired prolonged back focus and the possibility of having a front lens of relatively small diameter.

What is claimed is:

1. In a wide-angle retrofocus type of objective having eight lenses I-VIII wherein lenses III and IV are cemented together and have a common surface whose radius of curvature is $r_6$, said objective having for a focal length F of 100 mm, the following data:

| Lens | | F = 100 mm | | Glass Constants | |
|---|---|---|---|---|---|
| | | | | $n$ | $v$ |
| I | $r_1 = +$ | 160.34 | | | |
| | $r_2 = +$ | 78.42 | $t_1 = 6.94$ | 1.51633 | 64.1 |
| | $r_3 = +$ | 187.33 | $d_1 = 22.55$ | | |
| II | $r_4 = +$ | 81.33 | $t_2 = 6.94$ | 1.58913 | 61.1 |
| | $r_5 = +$ | 242.83 | $d_2 = 62.44$ | | |
| III | $r_6 = -$ | 242.83 | $t_3 = 34.69$ | 1.62004 | 36.3 |
| IV | $r_7 = -$ | 222.49 | $t_4 = 24.28$ | 1.51633 | 64.1 |
| | $r_8 = +$ | 103.19 | $d_4 = 5.20$ | | |
| V | $r_9 = -$ | 261.91 | $t_5 = 11.45$ | 1.81554 | 44.5 |
| | $r_{10} = -$ | 122.46 | $d_5 = 8.67$ | | |
| VI | $r_{11} = +$ | 90.19 | $t_6 = 27.75$ | 1.80518 | 25.4 |
| | $r_{12} = -$ | 109.64 | $d_6 = 8.60$ | | |
| VII | $r_{13} = -$ | 68.62 | $t_7 = 7.28$ | 1.69350 | 50.8 |
| | $r_{14} = -$ | 648.62 | $d_7 = 0.49$ | | |
| VIII | $r_{15} = -$ | 118.08 | $t_8 = 8.67$ | 1.71300 | 54.0 |

$F_{1 \cdot 2} = -132.3 \div -F/0.756$
$F_{1 \cdot 2 \cdot 3 \cdot 4} = +1135.9 \div F/0.088$
$F_B = 1.295F$ where $r_1 \ldots r_{15}$ are the radii in millimeters of the successive lens surfaces from front to rear, indicated as being positive where the center of curvature is at the rear of the objective and negative where the center of curvature is at the front of the objective, with the radius $r_6$ being common to the cemented surfaces of lenses III and IV, the thicknesses $t_1$–$t_8$ of the lenses I–VIII, respectively, also being in millimeters, with the distances $d_1$–$d_7$ between the successive lenses also being in millimeters, the glass constants $n$ being the d-line refractive index of the successive lenses and $v$ being the Abbe numbers of the successive lenses, while $F_B$ is the back focus, and $F_{1 \cdot 2}$ and $F_{1 \cdot 2 \cdot 3 \cdot 4}$ are respectively the composite focal lengths of the first two and first four lenses.

* * * * *